(12) United States Patent
George et al.

(10) Patent No.: US 10,024,492 B1
(45) Date of Patent: Jul. 17, 2018

(54) CABLE-MOUNTED TRAFFIC CONTROL DEVICE SUPPORT BRACKET WITH STRUT MEMBER ADAPTER

(71) Applicant: Pelco Products, Inc., Edmond, OK (US)

(72) Inventors: Kennith E. George, Edmond, OK (US); Angela R. Stussi, Edmond, OK (US)

(73) Assignee: Pelco Products, Inc., Edmond, OK (US)

( * ) Notice: Subject to any disclaimer, the term of this patent is extended or adjusted under 35 U.S.C. 154(b) by 0 days.

(21) Appl. No.: 15/480,069

(22) Filed: Apr. 5, 2017

Related U.S. Application Data

(60) Provisional application No. 62/319,712, filed on Apr. 7, 2016.

(51) Int. Cl.
  *F16M 13/02* (2006.01)
  *E01F 9/00* (2016.01)
  *F16B 2/08* (2006.01)

(52) U.S. Cl.
  CPC ............. *F16M 13/022* (2013.01); *E01F 9/00* (2013.01); *F16B 2/08* (2013.01)

(58) Field of Classification Search
  CPC ............. F16M 13/022; E01F 9/00; F16B 2/08
  USPC ................................ 248/214, 229.17, 230.9
  See application file for complete search history.

(56) References Cited

U.S. PATENT DOCUMENTS

| | | | | |
|---|---|---|---|---|
| 1,985,951 A * | 1/1935 | Richterkessing | ..... | B61L 5/1863 248/218.4 |
| 2,038,117 A * | 4/1936 | Layton | ..... | B61L 29/02 174/40 CC |
| 2,195,041 A * | 3/1940 | Von Schlippe | ........... | F16F 7/10 174/42 |
| 2,259,522 A * | 10/1941 | Hall | ........... | B63B 45/06 248/278.1 |
| 2,942,366 A * | 6/1960 | Pfaff, Jr. | ........... | G09F 15/0037 248/230.1 |
| 3,033,318 A * | 5/1962 | Jewell | ........... | F16L 3/215 174/42 |
| 3,142,501 A * | 7/1964 | Clark | ........... | F21V 21/116 248/230.1 |
| 3,586,280 A | 6/1971 | Parduhn | | |
| 3,612,222 A * | 10/1971 | Minor | ........... | E04B 1/985 188/268 |
| 3,764,099 A * | 10/1973 | Parduhn | ........... | G08G 1/095 248/214 |
| 3,854,685 A | 12/1974 | Parduhn | | |

(Continued)

FOREIGN PATENT DOCUMENTS

| CA | 2893727 A1 * | 5/2016 | ........... F16M 13/022 |
|---|---|---|---|
| CA | 2893727 A1 * | 5/2016 | ........... F16M 13/022 |

OTHER PUBLICATIONS

Pelco'S New Astro-Brac Galaxy, brochure, Dec. 2015, Pelco Products, Inc., Edmond, Oklahoma, USA (two pages).

*Primary Examiner* — Muhammad Ijaz
(74) *Attorney, Agent, or Firm* — Mary M. Lee

(57) ABSTRACT

A mounting bracket assembly for supporting a traffic control device on a mast arm or pole. The bracket includes a first clamp adapted to removably attach to the mast arm or pole or other elongate support, and is designed to be positioned vertically or horizontally. A second clamp is removably attachable to a strut member, such as a strut channel or tube.

9 Claims, 7 Drawing Sheets

(56) References Cited

U.S. PATENT DOCUMENTS

| | | | | |
|---|---|---|---|---|
| 3,888,446 A | * | 6/1975 | O'Brien | F16B 7/0486 248/230.1 |
| 3,891,175 A | * | 6/1975 | Hawley | G08G 1/095 248/317 |
| 3,917,205 A | * | 11/1975 | Meadors | F21V 21/116 248/229.17 |
| 3,977,641 A | * | 8/1976 | Garchinsky | G08G 1/095 248/274.1 |
| 4,010,925 A | * | 3/1977 | Garchinsky | G08G 1/095 248/295.11 |
| 4,032,248 A | | 6/1977 | Parduhn et al. | |
| D246,585 S | | 12/1977 | Parduhn | |
| D249,517 S | | 9/1978 | Parduhn | |
| 4,135,192 A | | 1/1979 | Parduhn | |
| 4,142,173 A | * | 2/1979 | Gould | F21V 21/116 174/650 |
| 4,167,033 A | * | 9/1979 | Fletcher | F21V 21/116 248/230.1 |
| 4,460,142 A | * | 7/1984 | O'Rorke | F16B 2/08 248/214 |
| D276,213 S | | 11/1984 | Parduhn | |
| 4,489,910 A | * | 12/1984 | Ferguson | F21V 21/116 248/219.4 |
| D286,667 S | | 11/1986 | Parduhn | |
| 4,659,046 A | * | 4/1987 | Parduhn | F21V 21/108 248/214 |
| 4,691,884 A | | 9/1987 | Parduhn | |
| 4,860,985 A | * | 8/1989 | Olson | F21V 21/116 248/214 |
| 4,917,338 A | * | 4/1990 | Olson | F21V 21/116 248/214 |
| D328,243 S | | 7/1992 | Parduhn | |
| D329,589 S | | 9/1992 | Parduhn | |
| D335,279 S | | 5/1993 | Parduhn | |
| 5,299,111 A | | 3/1994 | Parduhn et al. | |
| 5,340,069 A | * | 8/1994 | Niemeyer | F21V 21/116 248/214 |
| D370,825 S | | 6/1996 | Parduhn | |
| D373,947 S | | 9/1996 | Parduhn | |
| D379,756 S | | 6/1997 | Parduhn | |
| 5,645,255 A | * | 7/1997 | Parduhn | F21V 21/116 248/214 |
| 5,935,478 A | | 8/1999 | Parduhn | |
| 6,204,446 B1 | | 3/2001 | Parduhn | |
| 6,357,709 B1 | * | 3/2002 | Parduhn | F21V 21/116 248/214 |
| 7,258,314 B1 | | 8/2007 | Parduhn et al. | |
| 7,523,912 B1 | | 4/2009 | Woods | |
| 7,601,928 B1 | | 10/2009 | Magness et al. | |
| 7,997,546 B1 | * | 8/2011 | Andersen | F16B 2/08 248/214 |
| 8,173,904 B1 | | 5/2012 | Parduhn et al. | |
| 8,474,780 B2 | | 7/2013 | Parduhn et al. | |
| 8,875,451 B1 | | 11/2014 | Parduhn et al. | |
| 8,985,535 B1 | * | 3/2015 | Townsend, Jr. | F16M 13/022 248/214 |
| 9,200,654 B1 | * | 12/2015 | Parduhn | F16B 7/0493 |
| 9,316,349 B1 | | 4/2016 | Parduhn et al. | |
| 9,322,536 B1 | | 4/2016 | Parduhn et al. | |
| 9,559,275 B2 | | 3/2017 | Parduhn et al. | |
| 2011/0095162 A1 | | 4/2011 | Parduhn et al. | |
| 2016/0210849 A1 | | 7/2016 | Stussi et al. | |

* cited by examiner

CABLE-MOUNTED TRAFFIC CONTROL DEVICE SUPPORT BRACKET WITH STRUT MEMBER ADAPTER

CROSS-REFERENCE TO RELATED APPLICATION(S)

This application claims the benefit of U.S. provisional application No. 62/319,712 entitled "Cable-Mounted Traffic Control Device Support Bracket with Strut Member Adapter," filed Apr. 7, 2016, the contents of which are incorporated herein by reference

FIELD OF THE INVENTION

The present invention relates to traffic devices generally and more particularly, but without limitation, to mounting brackets for such devices.

DETAILED DESCRIPTION OF THE PREFERRED EMBODIMENT(S)

Figure 1:
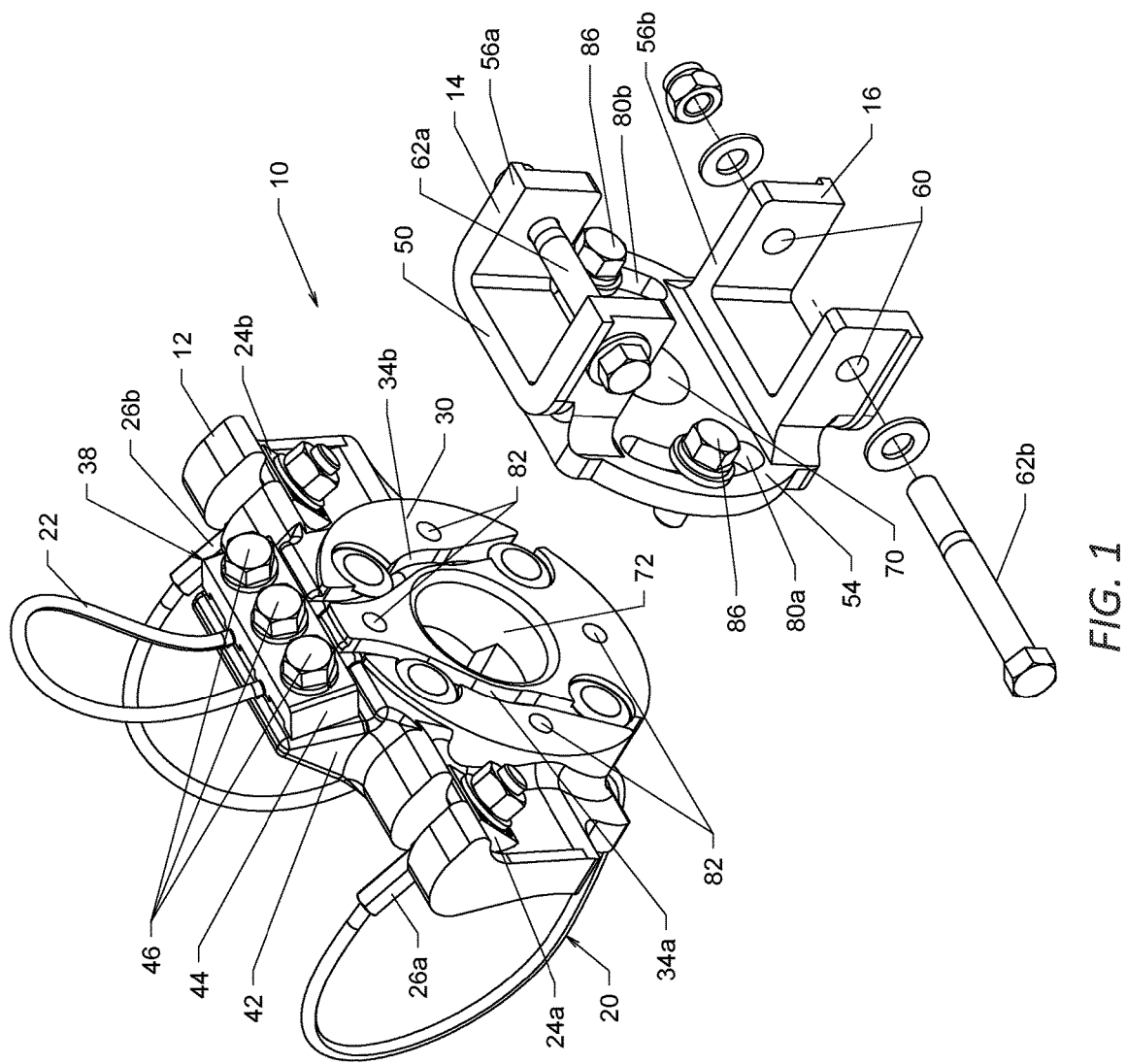
FIG. 1 is a partly exploded, perspective view of an assembled support bracket constructed in accordance with the present invention. The first clamp is a cable-mounted anchor plate. The second clamp comprises a strut member adapter.
Figure 2:
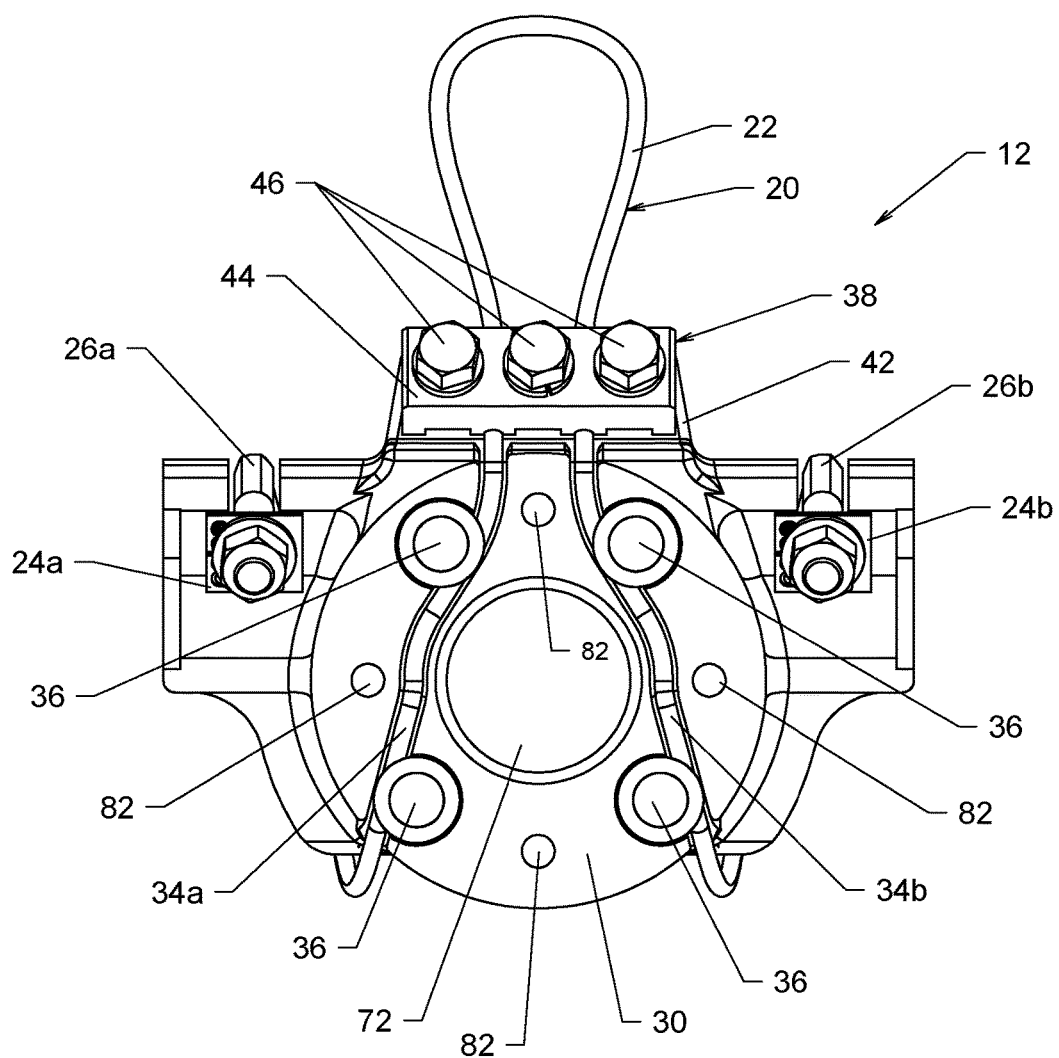
FIG. 2 is a front elevational view of the first clamp of the support bracket of FIG. 1 showing the cable secured in the cable receiving grooves formed in the front face of the clamp.
Figure 3:
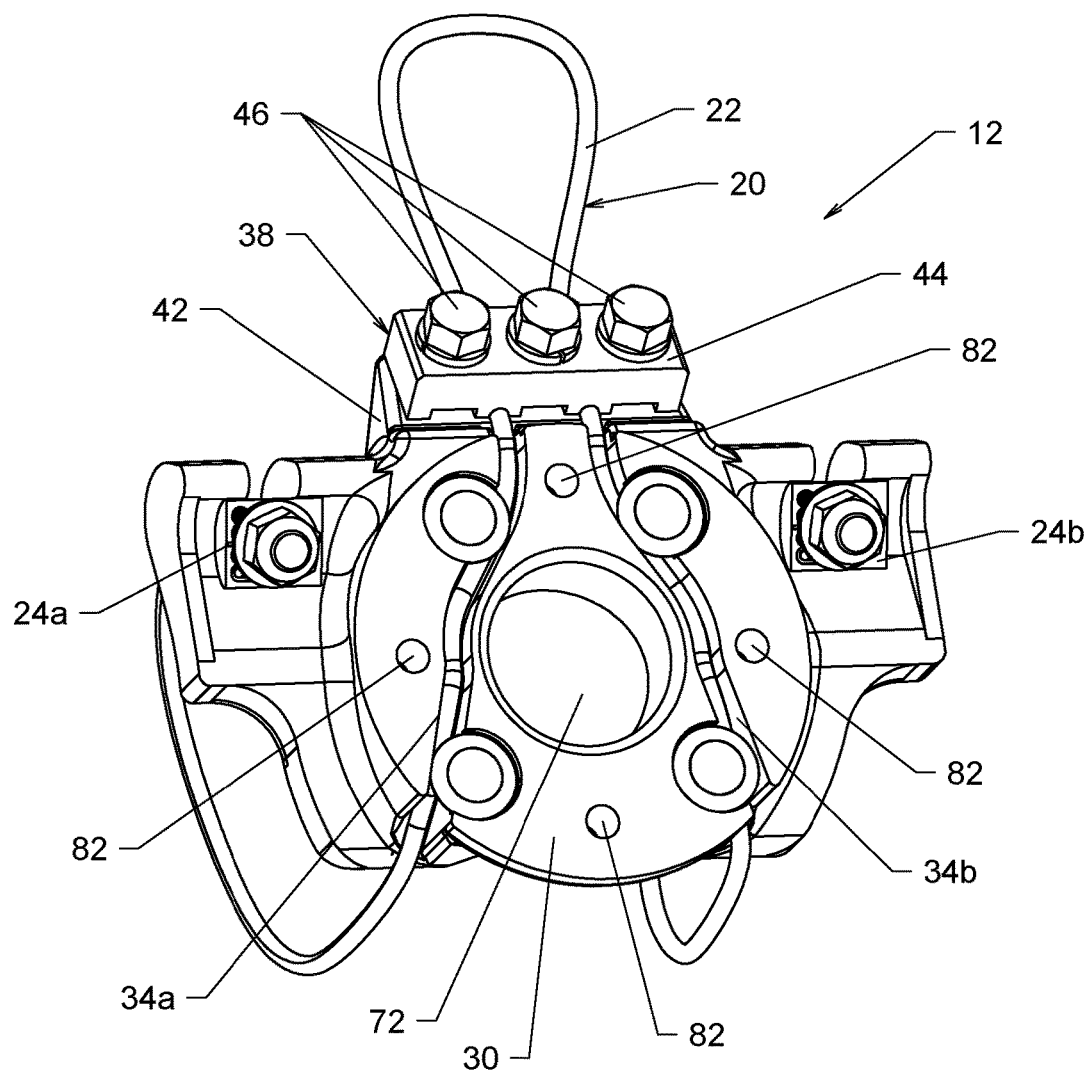
FIG. 3 is a perspective view of the first clamp shown in FIG. 2.
Figure 4:
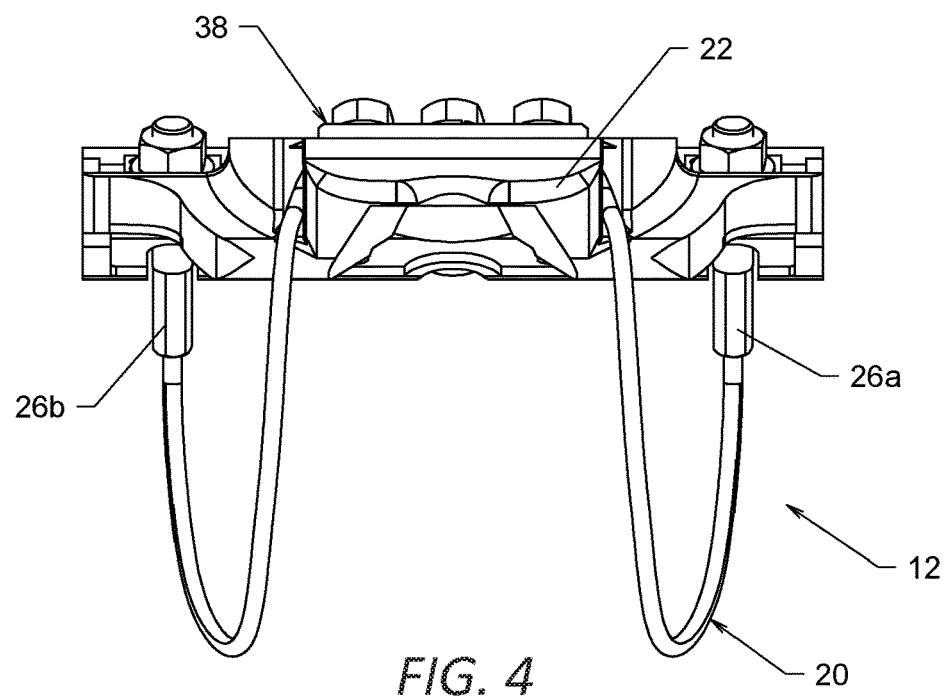
FIG. 4 is a plan view of the first clamp shown in FIG. 2.
Figure 5:
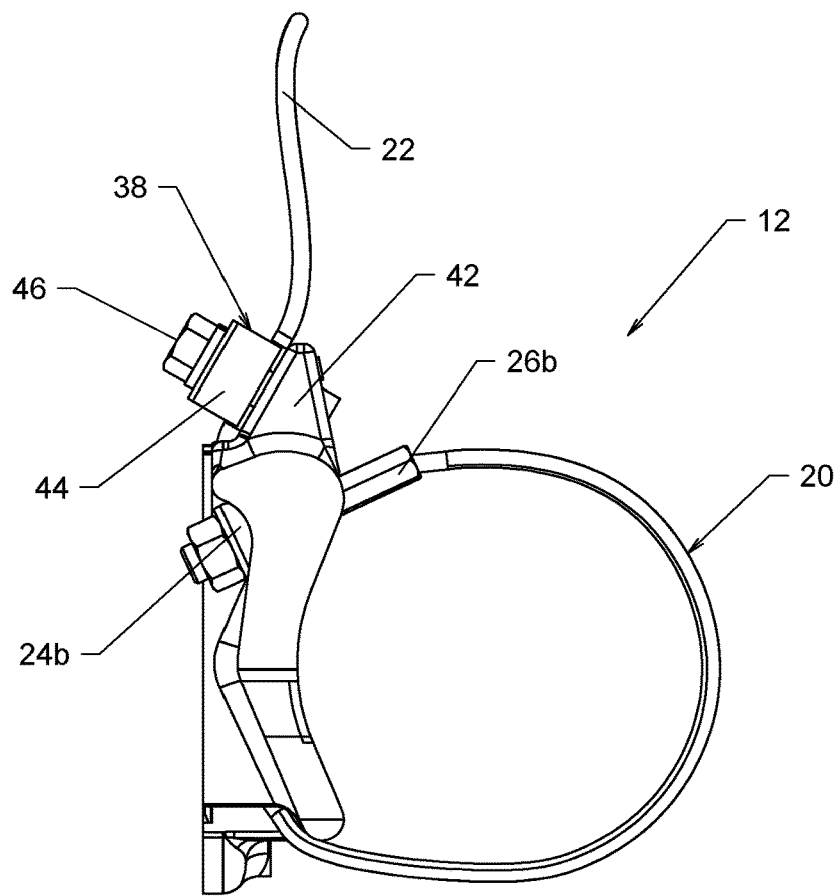
FIG. 5 is a side elevational view of the first clamp shown in FIG. 2.
Figure 6:
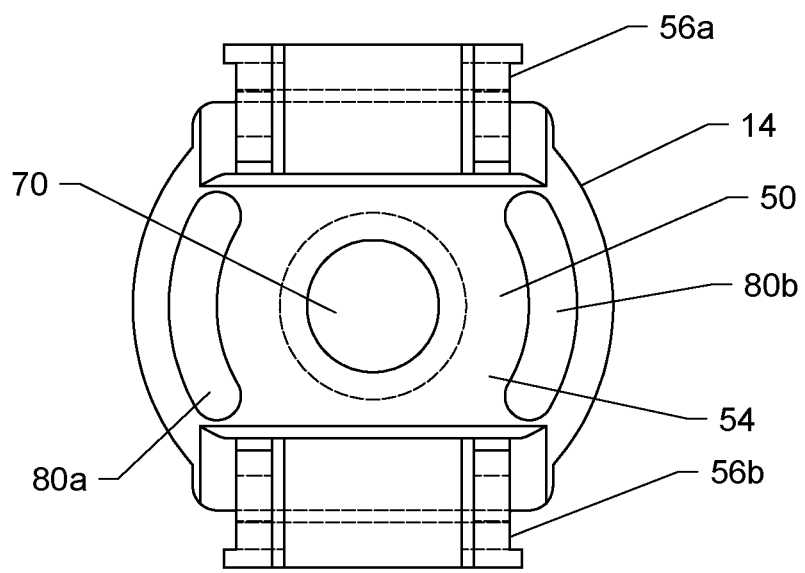
FIG. 6 is a front elevational view of the second clamp of the support bracket of FIG. 1.
Figure 7:
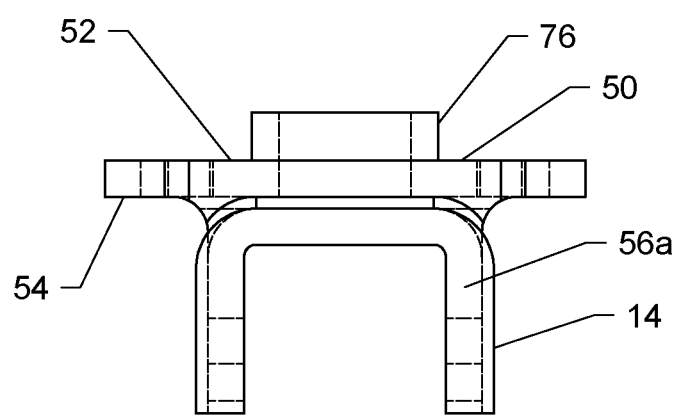
FIG. 7 is a plan view of the second clamp.
Figure 8:
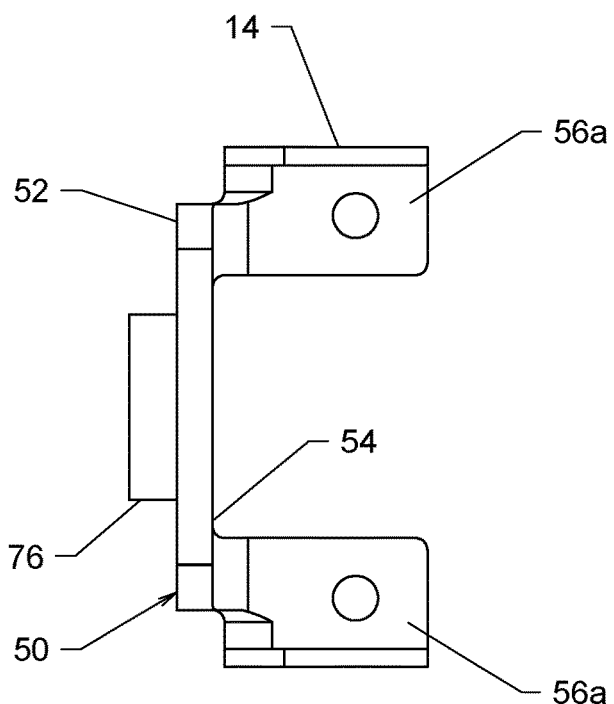
FIG. 8 is a side elevational view of the second clamp.
Figure 9:
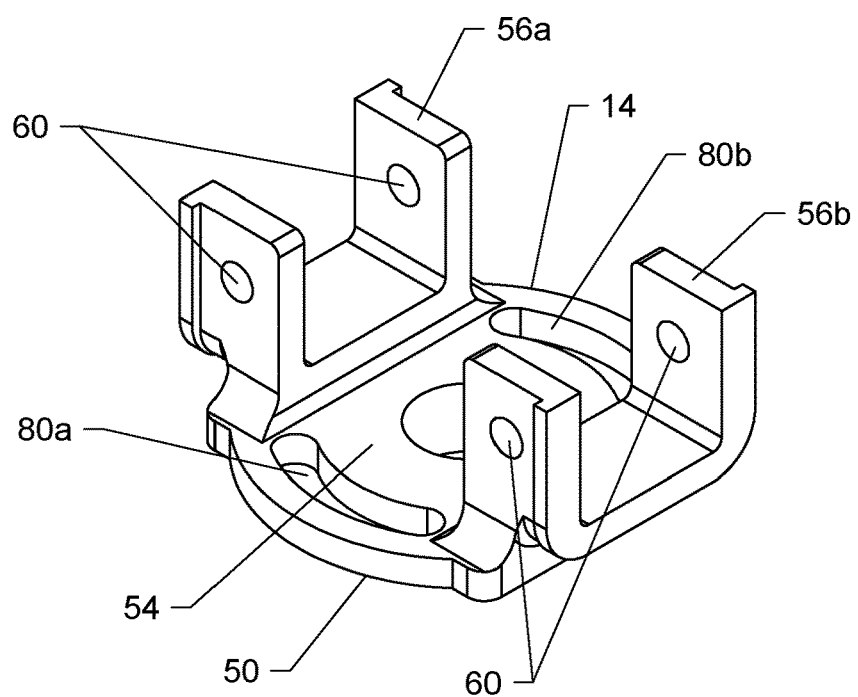
FIG. 9 is a perspective view of the second clamp.

Turning now to the drawings in general and to FIG. 1 in particular, there is shown therein a traffic control device support bracket made in accordance with a preferred embodiment of the present invention and designated generally by the reference numeral 10. As used herein, "traffic control device" includes traffic signs and signals, cameras, antennas, sensors, monitors, signs, junction boxes, wireless devices, microwave transmission devices, and any other device useful in the monitoring or control of pedestrian or vehicular traffic.

Figure 11:
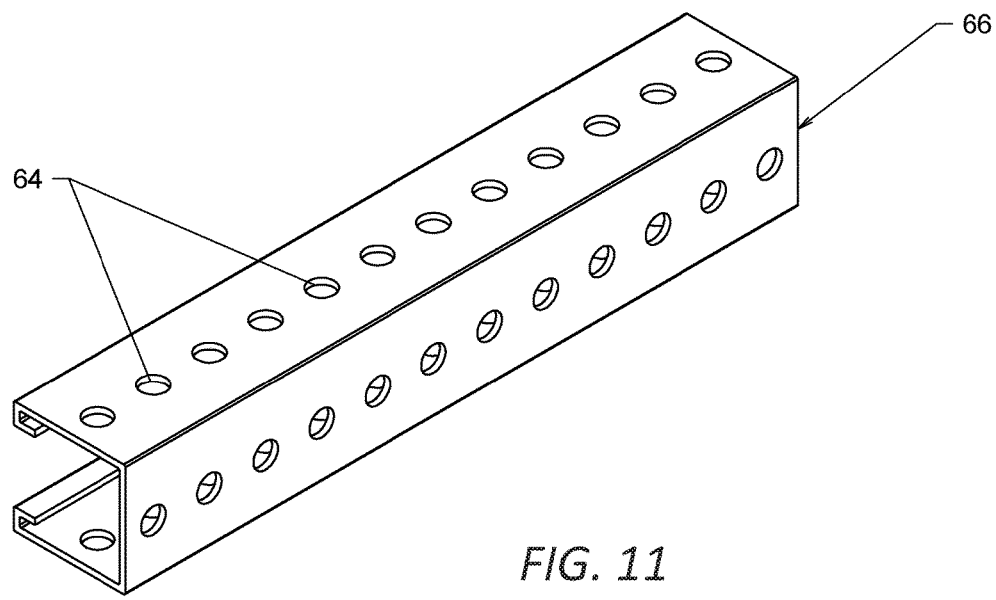
FIG. 11 is an illustration of a typical strut channel.

With continued reference to FIG. 1, the support bracket 10 comprises a first clamp 12 and a second clamp 14. The first clamp 12 is removably attachable to a support structure, such as a utility pole or mast arm, not shown. The second clamp 14 is removably attachable to the traffic control device (not shown) and comprises a strut adapter 16 designed to attach to a strut channel. "Strut channel," as used herein, refers to any one of several commercially available, standardized elongate structural members formed from a metal sheet folded over into an open channel shape with inwardly-curving lips to provide additional stiffness. "Strut tube," as used herein, refers to an elongate 4-sided (square in cross-section) tubular member. "Strut member," as used herein, encompasses both strut tubes and strut channels and denotes a member with at least three flat or planar sides defining at least two right angles. The typical strut member is perforated, that is, it has holes and/or slots along one or more sides to facilitate interconnection or fastening the strut member to other structures with bolts and washers and/or various other fittings, as illustrated in FIGS. 11 and 12. As shown in FIGS. 11 and 12, the strut members 66 may have at least one pair and preferably multiple pairs of aligned perforations for receiving one or more bolts therethrough, as described below.

Referring still to FIG. 1 and now also to FIGS. 2-5, the first clamp 12 may be attached to the mast arm or other support in any suitable manner. Preferably, the first clamp 12 comprises a connector assembly 20. One preferred connector assembly 20 is the cable assembly shown in FIG. 15. The cable assembly 20 includes a flexible metal cable 22 with a cable bolt 26a, 26b on each end. The cable bolts 26a, 26b are secured in slots using tightening collars and nuts 24a, 24b. Each tightening collar 24a and 24b fits in a curved recess formed in the front of the first clamp 12, as shown. The loop 22 of the cable then is wrapped around the mast arm or other support and brought up over the front face 30 on the clamp 12.

In accordance with a preferred embodiment of the present invention, the front face 30 of the first clamp 12 is provided with a pair of cable receiving grooves 34a and 34b. The grooves 34a and 34b extend from the bottom edge of the face 30 to the top edge of the face ending at a cable clamp 38, where the loose portion of the cable loop 22 is secured. The grooves 34a and 34b are sized to fully receive the cable so that the rear face of the second clamp 14 will fit flat against the front face 30 of the first clamp 12. One or more plastic snap-fit cable retainer buttons or so-called Christmas tree fasteners 36 (FIG. 2) may be provided to hold the cable inside the grooves 34a and 34b.

Preferably, the cable clamp 38 comprises a base 42 formed on the clamp 12 at the top edge of the face 30 and includes one or more bolt holes. A clamp plate 44, also provided with bolt holes, fits over the base 42. One or more connectors, such as the hex head bolts 46 shown, are included to secure the plate 44 over the base 42 pressing the cable loop 22 therebetween. The underside of the plate 44 may include cable grooves, seen best in FIG. 3, to grip the cable.

Now it will be appreciated that the grooves 34a and 34b and cable clamp 38 comprise an advantageous cable management assembly. The loop 22 of cable 20 is secured in position on the first clamp 12 by the cable clamp 38 while it is mounted to the mast arm or other support. With the clamp 12 held in place against the mast arm, the free ends 26a and 26b of the cable 20 are wrapped around the mast arm and positioned in the notches on the upper edge of the clamp 12. Then, the cable 20 is tightened by pulling the loop 22 further up through the clamp 38, and then the bolts 46 are tightened. The single cable clamp 38 along the top edge of the clamp 12 replaces the two separate cable clamps located along the bottom edge of prior art clamps. This simplifies manufacture as well as assembly and installation.

Additionally, because of the location of the bolt heads on the cable clamp 38, the clamp can use the same size bolts as the other bolts in the bracket 10, which means that only one size wrench or tool is required to tighten all the bolts in the device. Still further, the location of the cable clamp 38 and the path defined by the cable grooves 34a and 34b means that the cable 20 is wrapped around the mast arm or other support at an angle. This causes the tightened cable to grip the mast arm or other support more tightly and applies clamping force in the optimum area.

Referring still to FIG. 1 and turning now also to FIGS. 6-10, the preferred embodiment for the second clamp 14 will be described. The clamp 14 preferably comprises a planar center section 50. The center section 50 has a rear face 52 that interfaces with the front face 30 on the first clamp 12. Extending forwardly from the front face 54 of the center section 50 is at least one and preferably two U-shaped strut extensions 56a, 56b configured to receive a standardized size of strut member, such as the strut tube shown in FIG. 11 and the strut channel shown in FIG. 12. By way of example only, the strut members may be 2-inch members, and the strut extensions 56a and 56b are sized accordingly. In the embodiment shown, there are two spaced apart strut extensions. The opposing arms of the strut extensions 56a and 56b include aligned bolt holes designated collectively at 60 for receiving cross bolts 62a, 62b (FIG. 1). It will be appreciated that the cross bolts 62a, 62b extend through the holes or slots 64 (FIGS. 11&12) in the strut members 66.

The center section 50 of the second clamp 14 has a wire access opening 70 that aligns with a wire access opening 72 in the first clamp 12 for allowing the electrical and data conduits to pass through the bracket 10. The rear face 52 of the center section 50 includes a rearwardly extending collar 76 around the access opening 70 sized to be received inside the wire access opening 72 to ensure alignment.

Arcuate slots 80a and 80b formed in the center section 50 of the second clamp 14 are aligned with the bolt holes 82 in the front face of the first clamp 12. In this way, when the two clamp member 12 and 14 are loosely attached to each other by bolts 86 (FIG. 1) through the slots 80a and 80b and holes 82, the first and second clamp members 12 and 14 may be rotated relative to each other.

It will be understood that the first clamp member with the cable receiving grooves may be used with second clamps other than the one described and shown herein, such as those shown in the patents cited below. Additionally, it will be appreciated that the second clamp, which attaches to a strut member, may be used with other types of first clamps, such as those shown in the patents cited below.

U.S. Pat. No. 9,200,654, issued Dec. 1, 2015, for "Mounting Bracket for Traffic Control Device," and U.S. Pat. No. 7,997,546, issued Aug. 16, 2011, entitled "Mounting Assembly for Traffic Cameras and other Traffic Control Devices," are incorporated herein by reference.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions. The description and drawings of the specific embodiments herein do not point out what an infringement of this patent would be, but rather provide an example of how to use and make the invention.

What is claimed is:

1. A support bracket for mounting a traffic control device to an elongate support, the support bracket comprising:
   a first clamp comprising a front face defining a central wire access opening, two cable receiving grooves, one on each side of the wire access opening, and a rear face configured to engage the elongate support;
   a cable assembly for attaching the first clamp to the elongate support, the cable assembly comprising a flexible cable with first and second ends securable to the first clamp to form a loop and configured to wrap around the elongate support and the first clamp when the rear face of the first clamp is engaged with the elongate support so that the cable extends across the front face of the first clamp with a section of the cable received in each of the cable receiving grooves and with a section of loop extending beyond the front face;
   a second clamp removably attachable to the traffic control device, the second clamp comprising a rear face defining a wire access opening alignable with the wire access opening of the first clamp and configured to conform to the front face on the first clamp to cover the cable in the cable receiving grooves; and
   a cable clamp on the first clamp configured to secure the loop of the cable extending beyond the front face of the first clamp to the first clamp.

2. A support bracket for mounting a traffic control device to an elongate support, wherein the traffic control device comprises a strut member, wherein the strut member comprises at least three planar sides defining at least two right angles and includes a plurality of perforations including at least one pair and preferably multiple pairs of aligned perforations for receiving one or more bolts therethrough, the support bracket comprising:
   a first clamp configured to engage the elongate support;
   a connector assembly for attaching the first clamp to the elongate support;
   a second clamp comprising a center section removably attachable to the first clamp member and including at least one U-shaped strut extension extending from the center section shaped to receive the strut member and to conform to the shape of the strut member of the traffic control device, wherein each of the at least one strut extensions comprises spaced apart aligned bolt holes, the pair of aligned bolt holes in the strut extension alignable with at least one of the at least one pair of aligned perforations in the strut member;
   at least one cross bolt for each of the at least one strut extensions, each cross bolt extending through the spaced apart aligned bolt holes in the strut extension and the at least one pair of aligned perforations in the strut member for securing the strut member to the strut extension.

3. The support bracket of claim 1 wherein the first clamp has an upper edge that defines a pair of spaced apart notches for receiving the first and second ends of the cable of the cable assembly and each of the first and second ends of the cable includes a cable bolt for securing the first and second cable ends in the notches.

4. The support bracket of claim 3 wherein the front face on the first clamp is planar and has a bottom edge and a top edge and wherein the cable receiving grooves are angled inwardly from the bottom edge to the top edge.

5. The support bracket of claim 4 wherein the cable clamp comprises:
   a clamp base adjacent the top edge of the front face, the base having at least one bolt hole;
   a clamp plate having at least one bolt hole; and
   at least one bolt for attaching the clamp plate to the clamp base.

6. The support bracket of claim 5 wherein the clamp plate has a front and a back surface, wherein the back surface defines a pair of cable grooves to receive the sections of the cable loop compressed between the clamp base and the clamp plate, and wherein the dimensions of the cable grooves are selected to allow a portion of cable received in the cable grooves to extend beyond the plane of the back surface so that cable can be compressed between the clamp plate and the clamp base to secure the cable against movement.

7. The support bracket of claim 1 wherein the traffic control device comprises a strut member, wherein the strut member comprises at least three planar sides defining at least two right angles and includes a plurality of perforations including at least one pair and preferably multiple pairs of aligned perforations for receiving one or more bolts therethrough, wherein the second clamp comprises a center section having a front and a back, wherein the rear face is defined by the back of the center section, and wherein the second clamp further comprises:

at least one U-shaped strut extension extending from the center section and shaped to receive the strut member and to conform to the shape of the strut member of the traffic control device, wherein each of the at least one strut extensions comprises spaced apart aligned bolt holes, the pair of aligned bolt holes in the strut extension alignable with at least one of the at least one pair of aligned perforations in the strut member;

at least one cross bolt for each of the at least one strut extensions, each cross bolt extending through the spaced apart aligned bolt holes in the strut extension and the at least one pair of aligned perforations in the strut member for securing the strut member to the strut extension.

8. The support bracket of claim 7 wherein the at least one U-shaped strut extension comprises first and second U-shaped strut extensions spaced a distance apart on the center section of the second clamp.

9. The support bracket of claim 2 wherein the at least one U-shaped strut extension comprises first and second U-shaped strut extensions spaced a distance apart on the center section of the second clamp.

\* \* \* \* \*

UNITED STATES PATENT AND TRADEMARK OFFICE
CERTIFICATE OF CORRECTION

| | | |
|---|---|---|
| PATENT NO. | : 10,024,492 B1 | Page 1 of 1 |
| APPLICATION NO. | : 15/480069 | |
| DATED | : July 17, 2018 | |
| INVENTOR(S) | : Kennith E. George and Angela R. Stussi | |

It is certified that error appears in the above-identified patent and that said Letters Patent is hereby corrected as shown below:

On the Title Page
Column 2, Foreign Patent Documents: delete 2nd Line "CA 2893727 A1 * 5/2016...F16M 13/022".
Column 2, Other Publications: replace "Pelco'S" with --Pelco's--.

Figure 10:
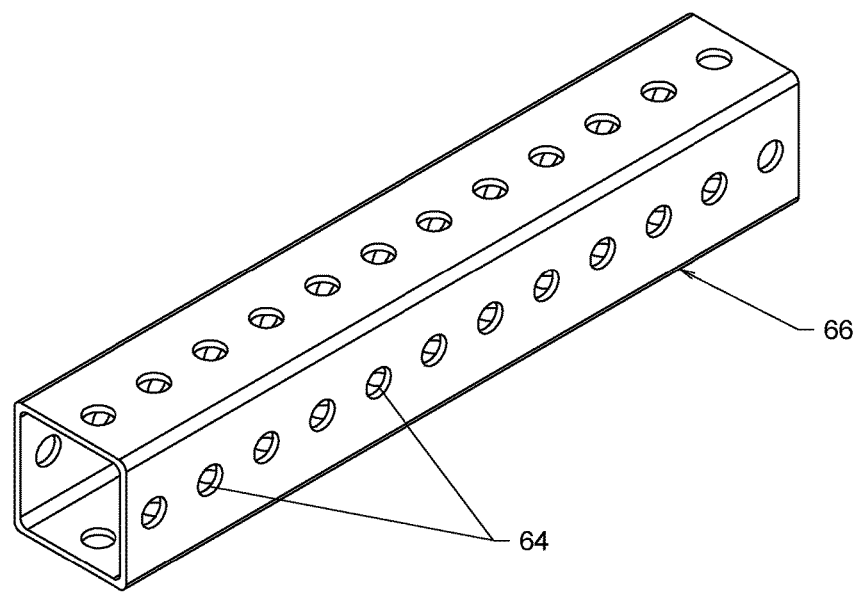
FIG. 10 is an illustration of a typical strut tube.

In the Specification
Column 2, Line 9: replace "FIGS 11 and 12" with --FIGS 10 and 11--.
Column 2, Line 10: replace "FIGS 11 and 12" with --FIGS 10 and 11--.
Column 2, Line 18: replace "FIG 15" with --FIG 1--.
Column 3, Line 6: replace "6-10" with --6-9--.
Column 3, Line 13: replace "FIG 11" with --FIG 10--.
Column 3, Line 14: replace "FIG 12" with --FIG 11--.
Column 3, Line 22: replace "FIGS 11 & 12" with --FIGS 10 and 11--.

Signed and Sealed this
Sixth Day of August, 2019

Andrei Iancu
*Director of the United States Patent and Trademark Office*